United States Patent
Lee et al.

(10) Patent No.: US 11,327,760 B2
(45) Date of Patent: May 10, 2022

(54) METHOD AND APPARATUS FOR BALANCING BINARY INSTRUCTION BURSTIZATION AND CHAINING

(71) Applicants: Andrew Siu Doug Lee, Toronto (CA); Ahmed Mohammed Elshafiey Mohammed Eltantawy, Markham (CA)

(72) Inventors: Andrew Siu Doug Lee, Toronto (CA); Ahmed Mohammed Elshafiey Mohammed Eltantawy, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 16/844,380

(22) Filed: Apr. 9, 2020

(65) Prior Publication Data

US 2021/0318875 A1  Oct. 14, 2021

(51) Int. Cl.
*G06F 9/30* (2018.01)
*G06F 9/38* (2018.01)

(52) U.S. Cl.
CPC ........ *G06F 9/30181* (2013.01); *G06F 9/3851* (2013.01); *G06F 9/3001* (2013.01);
(Continued)

(58) Field of Classification Search
CPC .. G06F 9/30181; G06F 9/3851; G06F 9/3004; G06F 9/30; G06F 9/30021;
(Continued)

(56) References Cited

U.S. PATENT DOCUMENTS

| 2008/0141253 | A1 | 6/2008 | Luick |
| 2015/0220345 | A1* | 8/2015 | Corbal ................. G06F 1/3243 712/214 |

(Continued)

FOREIGN PATENT DOCUMENTS

| CN | 105453031 A | 3/2016 |
| CN | 110045960 A | 7/2019 |

OTHER PUBLICATIONS

Ronny Krashinsky et al., The Vector-Thread Architecture, 2004 IEEE, [Retrieved on Dec. 7, 2021], Retrieved from the internet: <URL : https://ieeexplore.ieee.org/stamp/stamp.jsp?tp=&arnumber=1310763> 12 Pages (1-12) (Year: 2004).*

(Continued)

*Primary Examiner* — Anibal Rivera

(57) ABSTRACT

A method for grouping computer instructions includes receiving a set of computer instructions, grouping the set of computer instructions by register dependencies, identifying a plurality of single-definition-use flow (SDF) bundles based on a burstization criteria and a chaining criteria; and based on the SDF bundles, transforming the set of computer instructions. The transformation may include splitting one of the set of computer instructions and setting a burst parameter for the one of the set of computer instruction. The transformation may include grouping a plurality of the set of computer instructions and replacing a pair of register file accesses with a pair of temporary register accesses.

20 Claims, 20 Drawing Sheets

(52) U.S. Cl.
CPC ........ *G06F 9/3004* (2013.01); *G06F 9/30014* (2013.01); *G06F 9/3017* (2013.01); *G06F 9/30018* (2013.01); *G06F 9/30021* (2013.01); *G06F 9/30036* (2013.01); *G06F 9/30065* (2013.01); *G06F 9/30105* (2013.01); *G06F 9/30123* (2013.01); *G06F 9/30145* (2013.01); *G06F 9/30185* (2013.01); *G06F 9/30189* (2013.01); *G06F 9/3881* (2013.01); *G06F 9/3891* (2013.01)

(58) Field of Classification Search
CPC ............. G06F 9/30105; G06F 9/30065; G06F 9/3891; G06F 9/3881; G06F 9/3017; G06F 9/30036; G06F 9/30018; G06F 9/30145; G06F 9/3001; G06F 9/386; G06F 9/30014; G06F 9/30189; G06F 9/30123; G06F 9/30185
See application file for complete search history.

(56) References Cited

U.S. PATENT DOCUMENTS

| | | | |
|---|---|---|---|
| 2017/0060579 A1* | 3/2017 | Vincent | G06F 9/3871 |
| 2017/0351525 A1 | 12/2017 | Wang et al. | |
| 2018/0173291 A1* | 6/2018 | Levit-Gurevich | G06F 1/3206 |

OTHER PUBLICATIONS

Sparsh Mittal and Jeffrey S. Vetter. 2014. A Survey of Methods for Analyzing and Improving GPU Energy Efficiency. ACM Comput. Surv. 47, 2, Article 19 (Aug. 2014), 23 pages.

Yongjun Park, Jason Jong Kyu Park, Hyunchul Park, and Scott Mahlke. 2012. Libra: Tailoring SIMD Execution Using Heterogeneous Hardware and Dynamic Configurability. In Proceedings of the 2012 45th Annual IEEE/ACM International Symposium on Microarchitecture (MICRO-45). IEEE Computer Society, Washington, DC, USA, 84-95.

H. Zhou and J. Xue, "Exploiting mixed SIMD parallelism by reducing data reorganization overhead," 2016 IEEE/ACM International Symposium on Code Generation and Optimization (CGO), Barcelona, 2016, pp. 59-69.

H. Zhou (2016). Compiler techniques for improving SIMD parallelism (Doctoral dissertation, University of New South Wales, Sydney, Australia).

Hao Zhou and Jingling Xue. 2016. A Compiler Approach for Exploiting Partial SIMD Parallelism. ACM Trans. Archit. Code Optim. 13, 1, Article 11 (Mar. 2016), 26 pages.

Vasileios Porpodas, Rodrigo C. O. Rocha, and Luís F. W. Góes. 2018. VW-SLP: auto-vectorization with adaptive vector width. In Proceedings of the 27th International Conference on Parallel Architectures and Compilation Techniques (PACT '18). Association for Computing Machinery, New York, NY, USA, Article 12, 1-15.

* cited by examiner

200

```
fmax_v1    H16  ←  H12  H8
fmax_v1    H17  ←  H13  H9
fmax_v1    H18  ←  H14  H10
```
← 202

```
fmax_v3    H16  ←  H12  H8
```
← 204

300

|  |  |  |  | Register File | |
|---|---|---|---|---|---|
|  |  |  |  | Reads | Writes |
| fmax_v2 | H16 ← H12 | H4 | | 4 | 2 |
| fadd_v2 | H18 ← H16 | H14 | | 4 | 2 |
|  |  | Total: | | 8 | 4 |

← 302

|  |  |  |  | Register File | |
|---|---|---|---|---|---|
|  |  |  |  | Reads | Writes |
| fmax_v2 | tmp ← H12 | H4 | | 4 | 0 |
| fadd_v2 | H18 ← tmp | H14 | | 2 | 2 |
|  |  | Total: | | 6 | 2 |

← 304

```
400
                                          Register File
                                          Reads   Writes
       fmax_v1    H16 ← H12  H4            2        1
       fmax_v1    H17 ← H13  H5            2        1        402
       fmin_v1    H18 ← H16  H6            2        1
                                  Total:   6        3

Register File
                                          Reads   Writes
       fmax_v2    H16 ← H12  H4            4        2
       fmin_v1    H18 ← H16  H6            2        1        404
                                  Total:   6        3

Register File
                                          Reads   Writes
      ┌─────────────────────────────────────────────────┐
      │ fmax_v1    tmp ← H12  H4            2        0  │
      │ fmin_v1    H18 ← tmp  H6            1        1  │
      └─────────────────────────────────────────────────┘   406
       fmax_v1    H17 ← H13  H5            2        1
                                  Total:   5        2
```

500

|        |     |   |     |     | Reads | Writes |
|--------|-----|---|-----|-----|-------|--------|
| I0_v4  | H0  | ← | C0  | C4  | 8     | 4      |
| I1_v2  | H4  | ← | C8  | C10 | 4     | 2      |
| I2_v2  | H6  | ← | C12 | C14 | 4     | 2      |
| I3_v4  | H8  | ← | H0  | H4  | 8     | 4      |
| I4_v1  | H12 | ← | H8  | C16 | 2     | 1      |
| I5_v3  | H13 | ← | H9  | C17 | 6     | 3      |
|        |     |   |     | Total | 32  | 16     |

| I0_v4 | H0  | ← | C0  | C4  |
| I1_v2 | H4  | ← | C8  | C10 |
| I2_v2 | H6  | ← | C12 | C14 |
| I3_v4 | H8  | ← | H0  | H4  |
| I4_v1 | H12 | ← | H8  | C16 |
| I5_v3 | H13 | ← | H9  | C17 |

METHOD AND APPARATUS FOR BALANCING BINARY INSTRUCTION BURSTIZATION AND CHAINING

CROSS-REFERENCE TO RELATED APPLICATIONS

This is the first application filed for the present invention.

FIELD OF THE INVENTION

The present invention pertains to the field of compiler technology and in particular to a method and apparatus for optimizing energy usage in GPUs and other processing cores with parallel and multi-core capabilities.

BACKGROUND

The battery life of mobile devices (such as smartphones, laptops, and tablets) is an important factor when selecting between competing consumer and industrial devices. It may therefore be desirable to extend the battery life, even at the expense of decreased performance. Most mobile devices include a graphics processing unit (GPU) or other multi-core, parallel processing unit in order to optimize performance of operations required by graphics routines which often include support for vector and matrix operations.

There is a need for a method and apparatus to take advantage of power saving techniques that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus to allow a computer compiler or other software used together with a computer compiler to organize computer instructions into groups. By grouping computer instructions based on different criteria, such as a burstization criteria or a chaining criteria, more efficient compiled instructions may be created. Compiled instructions created using embodiments may be more efficient by having a smaller compiled instructions size, thereby requiring less computer memory, such as instruction cache, to store. Compiled instructions created using embodiments may also be more efficient by decreasing the use of a processor register file, thereby reducing power consumption which is advantageous when the compiled instructions are run on battery powered devices.

In accordance with embodiments, there is provided a method for grouping computer instructions including receiving a set of computer instructions, grouping the set of computer instructions by register dependencies, identifying a plurality of single-definition-use flow (SDF) bundles based on a burstization criteria and a chaining criteria, where each of the plurality of SDF bundles comprises one of the set of computer instructions. Based on the SDF bundles, transforming the set of computer instructions.

In further embodiments, the transformation includes splitting one of the set of computer instructions and setting a burst parameter for the one of the set of computer instructions. In other embodiments, the transformation includes grouping a plurality of the set of computer instructions and replacing a pair of register file accesses with a pair of temporary register accesses.

In further embodiments, the burstization criteria and the chaining criteria are biased to favour the burstization criteria. In other embodiments, the burstization criteria and the chaining criteria are biased to favour the chaining criteria.

A further embodiment includes identifying a first of the plurality of SDF bundles, removing the computer instructions contained in the first of the plurality of SDF bundles, and selecting a second of the plurality of SDF bundles from the remaining computer instructions of the set of computer instructions.

In further embodiments, a maximum burst of the burst parameter is constrained by a hardware resource limitation.

In accordance with further embodiments of the present invention, there is an apparatus for grouping computer instructions. The apparatus includes a CPU and a non-transitory computer readable storage medium configured to store compiler instructions.

The compiler instructions control the CPU to perform steps of receiving a set of computer instructions, grouping the set of computer instructions by register dependencies, identifying a plurality of single-definition-use flow (SDF) bundles based on a burstization criteria and a chaining criteria, where each of the plurality of SDF bundles comprises one of the set of computer instructions. Based on the SDF bundles, transforming the set of computer instructions.

In accordance with further embodiments of the present invention, there is an electronic device including a CPU and a non-transitory computer readable storage medium configured to execute the steps of a stored computer program. The stored computer program includes binary computer instructions compiled using the steps of receiving a set of computer instructions, grouping the set of computer instructions by register dependencies, identifying a plurality of single-definition-use flow (SDF) bundles based on a burstization criteria and a chaining criteria, where each of the plurality of SDF bundles comprises one of the set of computer instructions. Based on the SDF bundles, transforming the set of computer instructions.

Embodiments may be used in any computer system that supports the burstization and chaining of computer instructions. In particular, embodiments provide advantages when used in computer systems that include graphics processing units (GPUs).

BRIEF DESCRIPTION OF THE FIGURES

Further features and advantages of the present invention will become apparent from the following detailed description, taken in combination with the appended drawings, in which:

FIG. 5 illustrates a sample instruction set used to describe an embodiment.

FIG. 6 illustrates a first step in determining dependencies between computer instructions of the sample instruction set.

It will be noted that throughout the appended drawings, like features are identified by like reference numerals.

DETAILED DESCRIPTION

Figure 1:
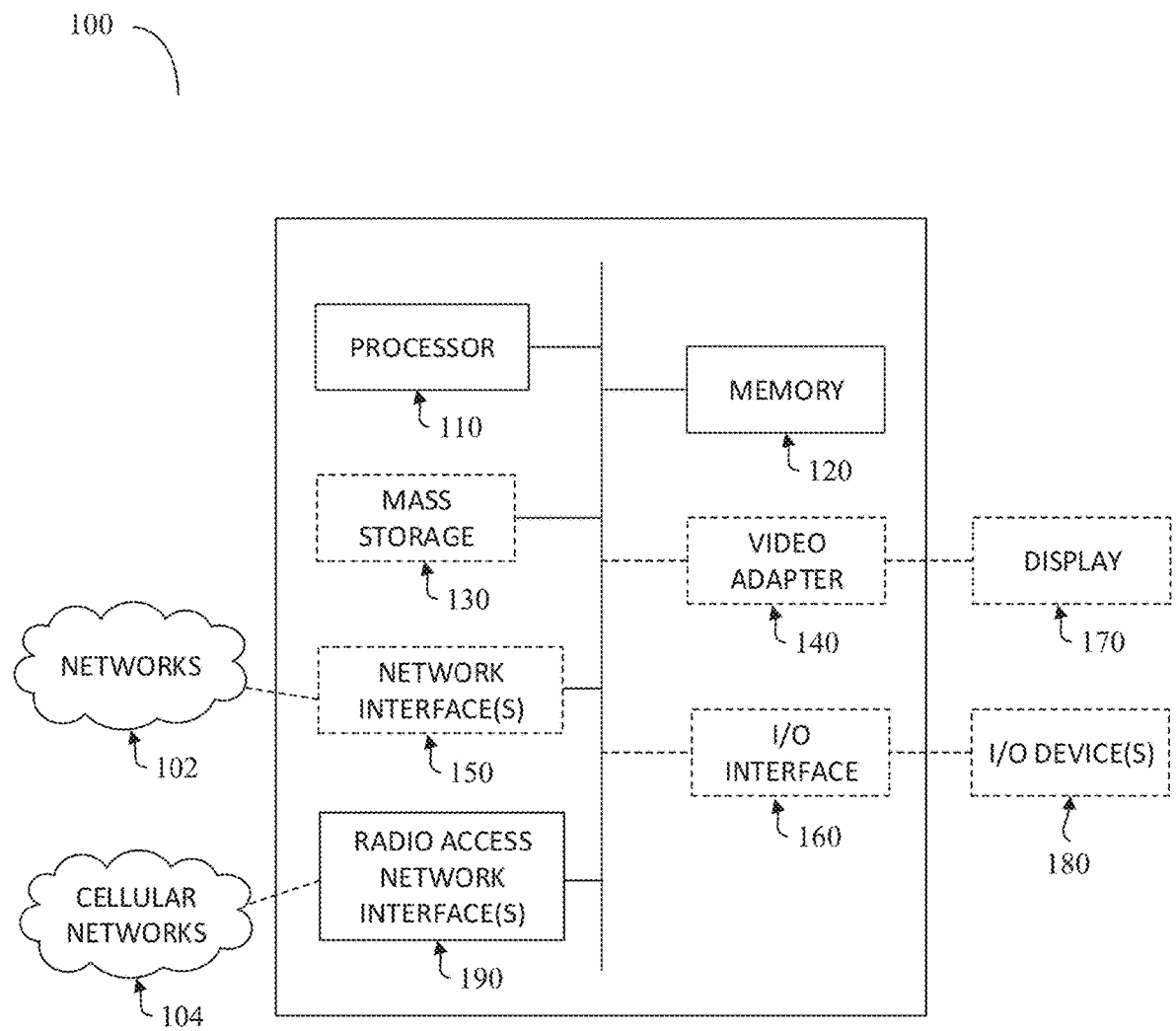
FIG. 1 illustrates an apparatus for implementing or utilizing embodiments.

In accordance with embodiments of the present invention, there are provided methods and apparatus that implement algorithms for use in a compiler that establishes both chaining and burst parameters for computer instructions in a given computer program by reordering the computer instructions and taking both parameters into account. Embodiments determine a balance between burstization and chaining of computer instructions and may include biases towards either burstization or chaining based on various criteria.

Burstization, also known as instruction burstization, is a way of representing multiple, consecutive computer instructions of the same opcode (part of a binary instruction used by a compiler) with a single instruction that contains a burst parameter field. The burst parameter indicates how many times the computer instruction is to be repeated in order to have the same effect as multiple consecutive computer instructions of the same opcode. Burstization produces compiled computer programs with a smaller compiled instructions size that reduces the amount of memory required for the compiled instructions to be stored in the instruction cache of a processor. It also decreases the power usage of a computing device by reducing the number of instructions that need to be fetched from storage, decoded, and scheduled.

As used herein, a burstization criteria may refer to a desired or actual burst parameter field of a computer instruction. The burstization criteria may be constrained by a number of factors such as not exceeding a maximum number, width of computer registers, availability of computer registers, available storage, etc. Factors constraining the burstization criteria may be dependent on a hardware resource limitation of a processor of an electronic device that the compiled computer program is to be run on. Hardware limitations may be dictated by any combination of hardware, microcode, firmware, software, etc., and may include, but are not limited to, register file size, number of concurrent threads (which may each need their own set of registers), and register bank conflicts.

Chaining, also known as instruction chaining, is the linking of computer instructions so that they execute consecutively, or in a way that they may take advantage of data dependency relationships between the computer instructions. A data dependency is a situation in which a computer instruction refers to data used by a following computer instruction. Chaining takes advantage of data dependency situations where an instruction and a following instruction both use data that is stored in the same register of a processor. Chaining involves reordering computer instructions and replacing register file accesses with temporary register accesses so that the data is directly forwarded from the producing instruction to the consuming instruction without passing through and activating the register file. This is advantageous since in most computer processors, a temporary register access (read or write) requires less power (and may be faster) than a register file access. The power usage of accessing the register file can be significant, depending on the register file size and distance from the execution unit of a processor. In some embodiments, the use of temporary registers may be replaced with the use of a forwarding datapath to achieve similar benefits.

As used herein, a chaining criterion may refer to a desired or actual number of computer instructions that may be chained together. The chaining criteria may be constrained by a number of factors such as not exceeding a maximum number, width of computer registers, availability of computer registers, available storage, etc. Factors constraining the chaining criteria may be dependent on a hardware resource limitation of a processor of an electronic device that the compiled computer program is to be run on. Hardware limitations may be dictated by any combination of hardware, microcode, firmware, software, etc. and may include, but are not limited register file size, number of concurrent threads (which may each need their own set of registers), and register bank conflicts.

Burstization and chaining are both desirable properties which may co-exist if appropriate conditions are met. In a desirable case, computer instructions having the same burst parameter may also be chained. However, often chaining can only be applied at the expense of burstization by reducing the burst parameter (the number of times the instruction is repeated) and vice versa. Embodiments of the invention allow for the combining of burstization and chaining, allowing for tradeoffs to be made between the two techniques. Embodiments may realize these tradeoffs by ensuring that the burstization criteria and the chaining criteria are biased to favour the burstization criteria, or that the burstization criteria and the chaining criteria are biased to favour the chaining criteria. Biasing to favour the burstization criteria may include using a larger burst parameter even if it decreases the number of computer instructions that may be chained. Biasing to favour the chaining criteria may include chaining a larger number of computer instructions even though it decreased the burst parameter (the number of repetitions) of a computer instruction.

As used herein, grouping may refer to organizing computer instructions into groups based on a burstization criteria or a chaining criteria. Computer instruction that are combined into a group based on burstization are one example of a group. Computer instructions that are linked together based on chaining are another example of a group.

FIG. 1 illustrates a computing system 100 such as a computing device used to compile software according to methods disclosed herein. Computing system 100 is also illustrative of a mobile device (such as a laptop, tablet, or smartphone) that may store and execute software compiled using the methods disclosed herein. Specific embodiments may utilize all of the components shown or only a subset of the components, and levels of integration may vary amongst computing systems. Furthermore, a computing system may contain multiple instances of a component, such as multiple processing units, processors, memories, transmitters, receivers, etc.

A computing device used to compile software using a compiler, refers to a computing device that transforms or translates a plurality or set of computer instructions (also called computer code) written in a first programming language (which can be a programming language understandable by humans) into computer code written in a second language (which can be understood by a machine, such as mobile devices and other target platforms). A 'set' of computer instructions may be any grouping or collection of computer instructions, and need not be a complete application or routine. Before transforming computer instructions, a compiler that runs on a CPU (central procession unit, or processor) 110 must first receive the instructions. Computer instructions may be received over a bus, read from a memory 120, read from a mass storage device 130, received over an I/O interface 160, received over a network interface 150, received from a radio access network interface 190, etc. Transforming computer instructions from one programming language to another often involves more than converting one language to another, instruction-by instruction. Compiling can also include arranging or organizing computer instructions in a fashion such that the computer instructions will be executed in a better way in some fashion (e.g., more energy efficient) when executed by the mobile devices and other target platforms.

The computing system 100 typically includes a central processing unit 110, a bus and a memory 120, and may optionally also include a mass storage device 130 (another form of memory), a video adapter 140, and an input-output (I/O) interface 160 (each shown in dashed lines to indicate they are optional). The computing system may further include one or more network interface(s) 150 for connecting the computing system to other computing systems through a communication network 102. The computing system may further include one or more radio access network interface(s) 190 for connecting the computing system to other computing systems through a cellular communication network 104. When working as a compiler, computing system 100 may receive a set of computer instructions for compiling from memory, mass storage, by way of any input or network interface, or by other means as known in the art.

The CPU 110 may comprise any type of electronic data processor and may include one or more cores or processing elements. Cores or processing elements may include GPUs, vector processors, and other computing hardware optimized for specialized computing applications (as indicated by context, 'to optimize' and variants do not refer to selecting the best possible choice under all circumstances; rather, 'to optimize' refers to selecting what is or is likely to be the best choice given a group of conditions or constraints). The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage 130 may comprise any type of non-transitory storage device configured to store data, programs, and other information to implement a software compiler and associated development or runtime system, and to make the data, programs, and other information accessible via the bus. The mass storage may comprise, for example, one or more of a solid state drive, hard disk drive, a magnetic disk drive, or an optical disk drive.

The video adapter 140 and the I/O interface 160 provide optional interfaces to couple external input and output devices to the processing unit. Examples of input and output devices include a display 170 coupled to the video adapter 140 and an I/O device 180 such as a touch-screen, keyboard, mouse, etc. coupled to the I/O interface 160. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

Figure 2:
FIG. 2 illustrates an example of computer instructions using burstization.

FIG. 2 illustrates an example of burstization 200. Three identical computer instructions 202 are shown for illustrative purposes. In this example, the instruction is 'fmax' which takes the value of two input registers, for example H8 and H12 and writes the higher value of H8 and H12 to output register H16. As used herein, the instruction, 'fmax', has a suffix, 'v1' to indicate the number of times the instruction is to be repeated. Here, since there are 3 identical computer instructions they may be grouped in a burst, as indicated by the 'v3' suffix in burst instruction 204. It should be noted that when burst notation is used, the first execution of the burst will use the registers indicated, for example, H16, H12, and H8. Subsequent executions of the burst will increment the register number. For example, the second burst will utilize registers H17, H13, and H9, the third burst will utilize H18, H14, and H10, etc. If sufficient parallel processing resources are available, the burst instructions may be executed in parallel. If parallel processing resources are not available, the burst instructions will be executed sequentially. If parallel processing resources are available but insufficient to execute the entire burst in parallel, then the burst may be executed in a sequence of parallel computer instructions. For example: fmax v12 when up to 4 computer instructions can be executed in parallel could be executed as 4 parallel computer instructions executed 3 times sequentially.

Though the instruction is still executed 3 times, the instruction storage space is ⅓ of the original, unchained instructions 202. This leads to more compact instruction that has benefits such as requiring less cache space.

Figure 3:
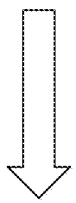
FIG. 3 illustrates an example of chaining of computer instructions.

FIG. 3 illustrates an example of instruction chaining 300. The unchained instruction 302 includes an fmax instruction followed by a fadd instruction where the output register of the fmax instruction, H16, is an input to the subsequent fadd instruction. Both the fmax and fadd instruction have a burst of 2 as indicated by their 'v2' suffixes. Input and output registers such as H4, H12, H16, etc. may be located in a register file of a CPU, GPU, etc. and there is a power cost and latency to read or write to a register in the register file. In this example, H16 is the output of the fmax instruction and is immediately followed by the fadd instruction that uses H16 as an input so these two computer instructions may be chained 304. Chaining comprises using a temporary register, tmp, within the processor in place of H16. Accessing a temporary register does not require a read or write to the register file, thus uses less power and, in some architectures, may have lower latency. For the unchained instruction 302, each execution of each instruction involves 2 reads and 1 write. Since there are 2 computer instructions that are executed 2 times each this totals 8 reads and 4 writes. For the chained instruction 304, use of the tmp register reduces the number of reads and writes required. The 2 executions of the fmax instruction no longer require writes and the 2 executions of the fadd instruction only require 2 reads from the H14 register for a total of 6 reads and 2 writes.

Figure 4:
FIG. 4 illustrates and example of computer instructions that may utilize burstization or chaining techniques.

FIG. 4 illustrates an example of a tradeoff between burstization and chaining 400. Original computer instructions 402 are 2 fmax instructions followed by an fmin instruction, each executed 1 time. This implementation requires 2 reads and 1 write per instruction for a total of 6 reads and 3 writes. Burstization 404 is used to combine the two fmax instructions. This decreases the number of computer instructions from 3 to 2 but leads to no decrease in the required number of accesses to the register file. The computer instructions may be chained 406 by reordering them so that the fmin instruction comes directly after the first fmax instructions. This allows the use of a tmp register to replace H16 and a reduction in the required reads and writes to the register file. However, this approach also splits the two fmax instructions, preventing them from being combined into a burst.

FIG. 5 shows example instructions 500 that will be used to illustrate an embodiment of the invention. The method illustrated may be used with any compatible computer instructions in architectures that support instruction chaining and burstization. The sample instructions include 6 computer instructions that are executed in bursts, for example a burst of 4 for instruction 0 (I0), and a burst of 2 for instruction 2 (I2). Registers may be either regular registers, prefixed by 'H', or constant registers, prefixed by 'C'. Regular registers are designed for read/write operations while constant registers will be optimized for multiple read operations. The number of required reads and writes is annotated and totals 32 reads and 16 writes for the unoptimized instructions.

FIGS. 6 through 9 illustrate the creation of a dataflow lane diagram for the instructions. A register dependency may be thought of generally as one computation not being performable until a value in a register is settled or no longer needed, or where computer instructions otherwise create an actual or potential conflict as to the use of a register. Sets of computer instructions may be grouped by register dependencies where there is a register dependency between the computer instructions in the set. Determining whether there are register dependencies can be useful when compiling computer instructions. FIG. 6 illustrates how the register dependencies 604 between example computer instructions 602 may be determined. There are no register conflicts between computer instructions I0, I1, and I2 as their input and output registers are not shared. Assuming no hardware limitations, the 4 bursts of I0, the 2 bursts of I1, and the 2 bursts of I2 can all be executed without worrying about conflicts. H0, the output register for I0, and H4, the output register of I1, are inputs to I3 so execution of I3 is dependent on I0 and I1 and must be delayed until execution of I0 and I1 is complete. Similarly, I4, which has H8 as an input, and I5, which has H9 as an input, are both dependent on the output of I3.

Hardware limitations may be dictated by any combination of hardware, microcode, firmware, software, etc. and may include, but are not limited register file size, number of concurrent threads (which may each need their own set of registers), and register bank conflicts.

Figure 7:
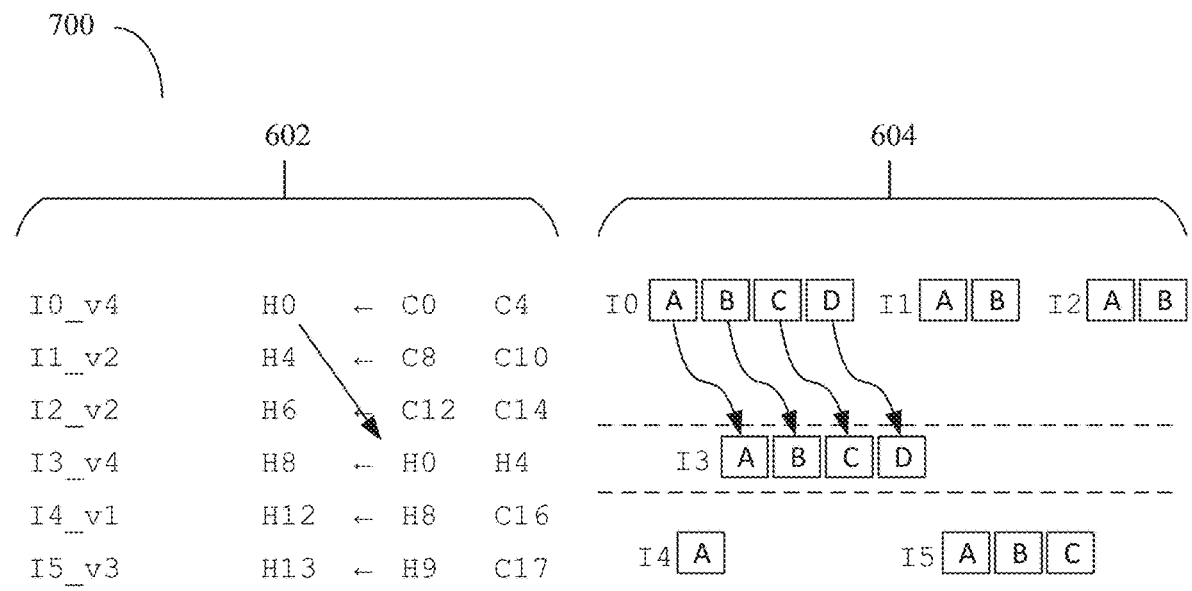
FIG. 7 illustrates how registers used by computer instructions are illustrated when determining dependencies.

As illustrated in FIG. 7, I0 has a burst of 4 and will use registers H0, H1, H2, and H3 for their outputs. I3 also has a burst of 4 and the 4 executions of I3 will have as a first input register, H0, H1, H2, and H3 as shown by the arrows.

Figure 8:
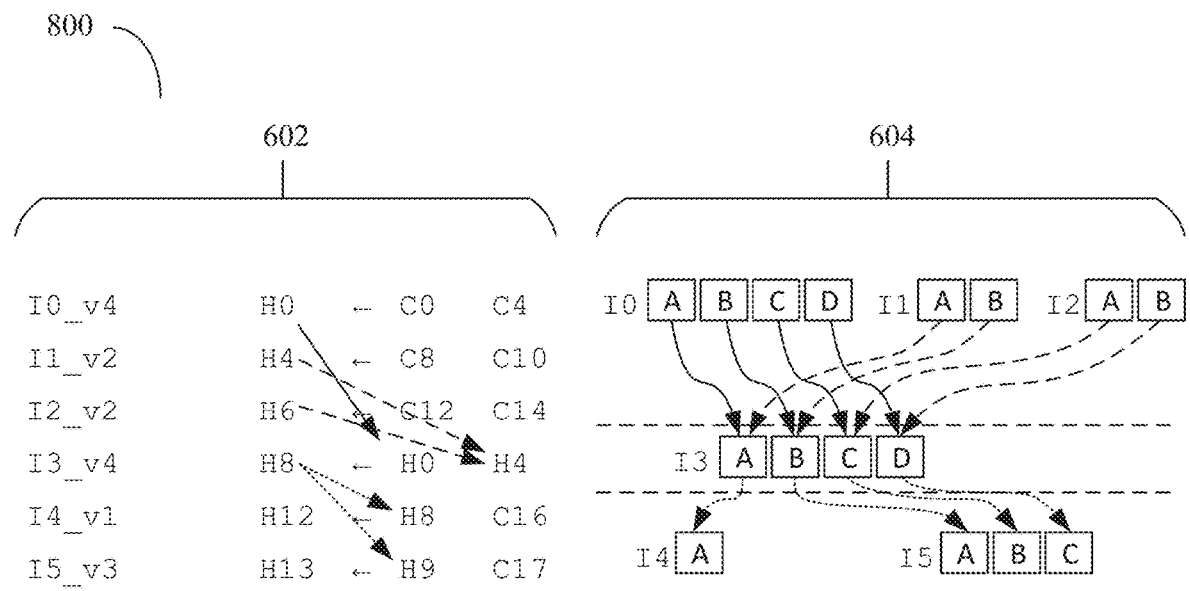
FIG. 8 illustrates all dependencies for the example set of computer instructions.

FIG. 8 illustrates all the dependencies for computer instructions 602. Like arrows (solid, dashed, dotted) in the computer instructions 602 are matched with like arrows in the dependency view 604.

Figure 9:
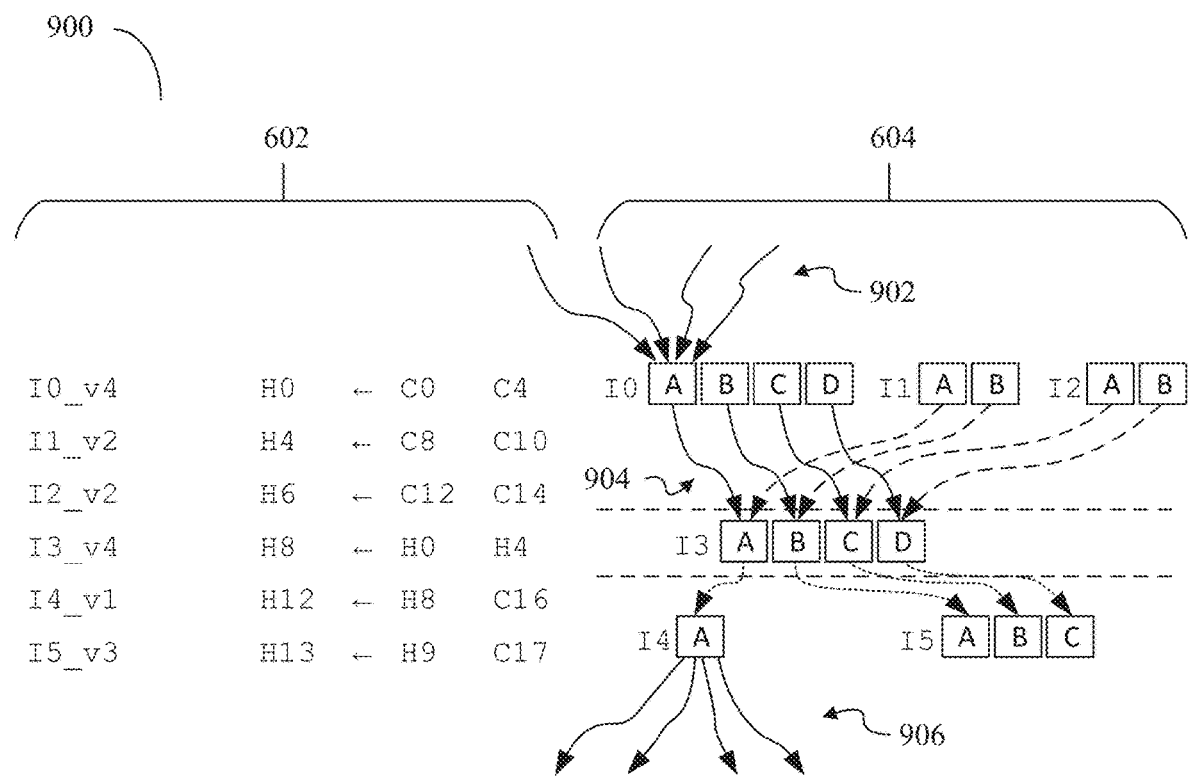
FIG. 9 illustrates an example of a single-definition-use flow in the example set of computer instructions.
Figure 10:
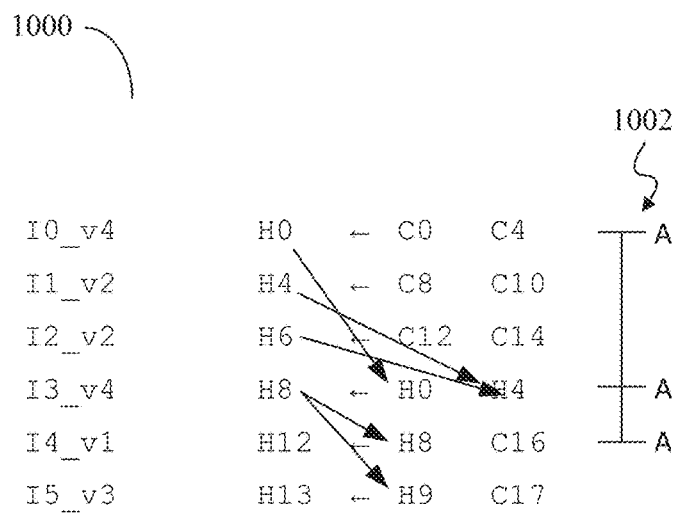
FIG. 10 illustrates a graphic representation of an SDF chain.

The following figures illustrate identifying a plurality of single-definition-use flow (SDF) bundles, and techniques by which such identification may be based on a burstization criteria and a chaining criteria. FIG. 9 illustrates the first step in generating SDF sets. SDF sets are chains of dependencies where each link has only one parent (definer) and one child (user). Graphically they can be represented as shown in FIG. 10 which illustrates an example of an SDF 904 starting at $I0_A$, then $I3_A$, and ending at $I4_A$. This is possible even though the inputs to I0 902 may have multiple definitions, and the outputs of I4 906 may have multiple users. FIG. 10 illustrates the use of a bar 1002 to illustrate an SDF starting at $I0_A$, then $I3_A$, and ending at $I4_A$.

Figure 11:
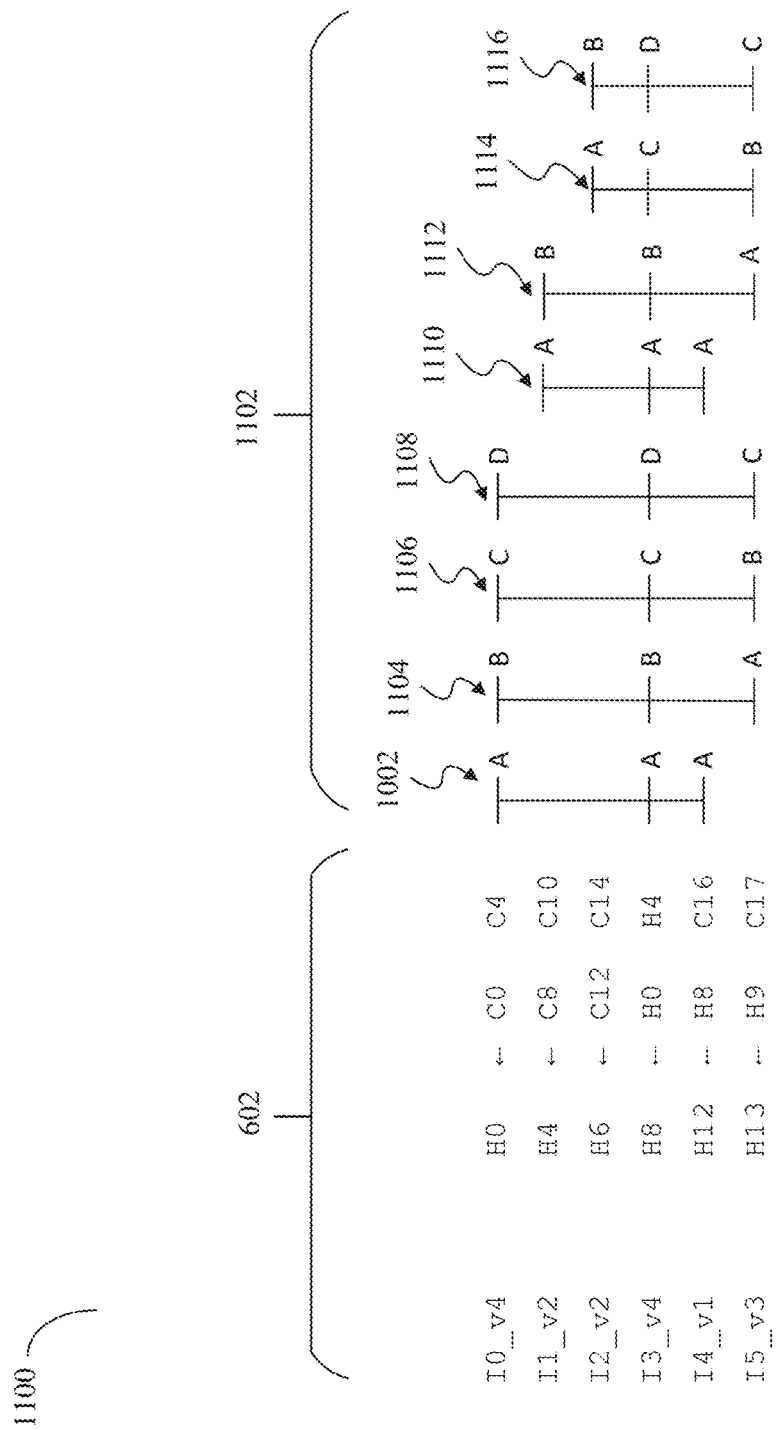
FIG. 11 illustrates a graphic representation of all the SDF chains in the sample instruction set.

FIG. 11 illustrates the bars 1102 for all the SDFs of the computer instructions 602.

Figure 12:
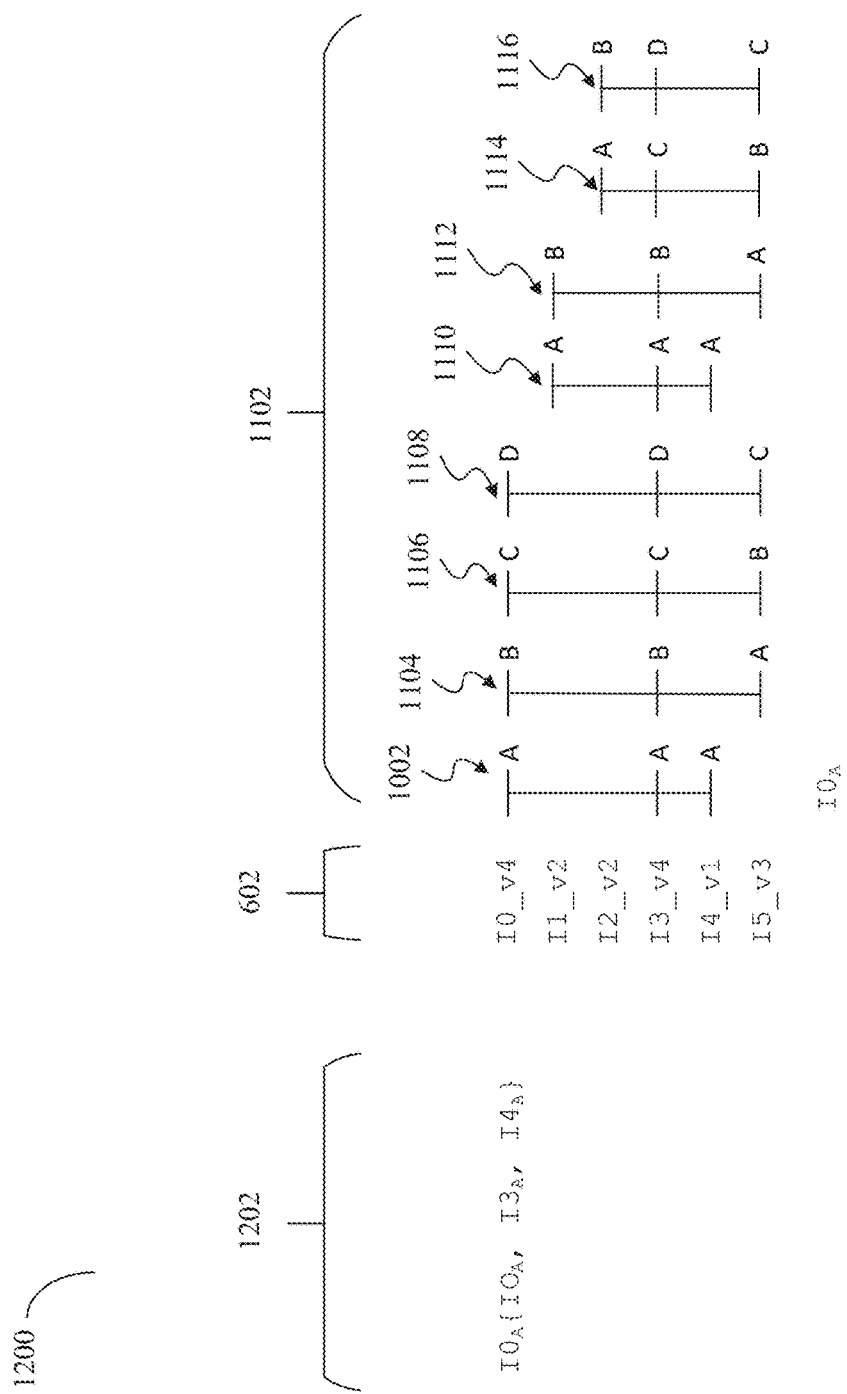
FIG. 12 illustrates the instruction set included in a first SDF chain.
Figure 13:
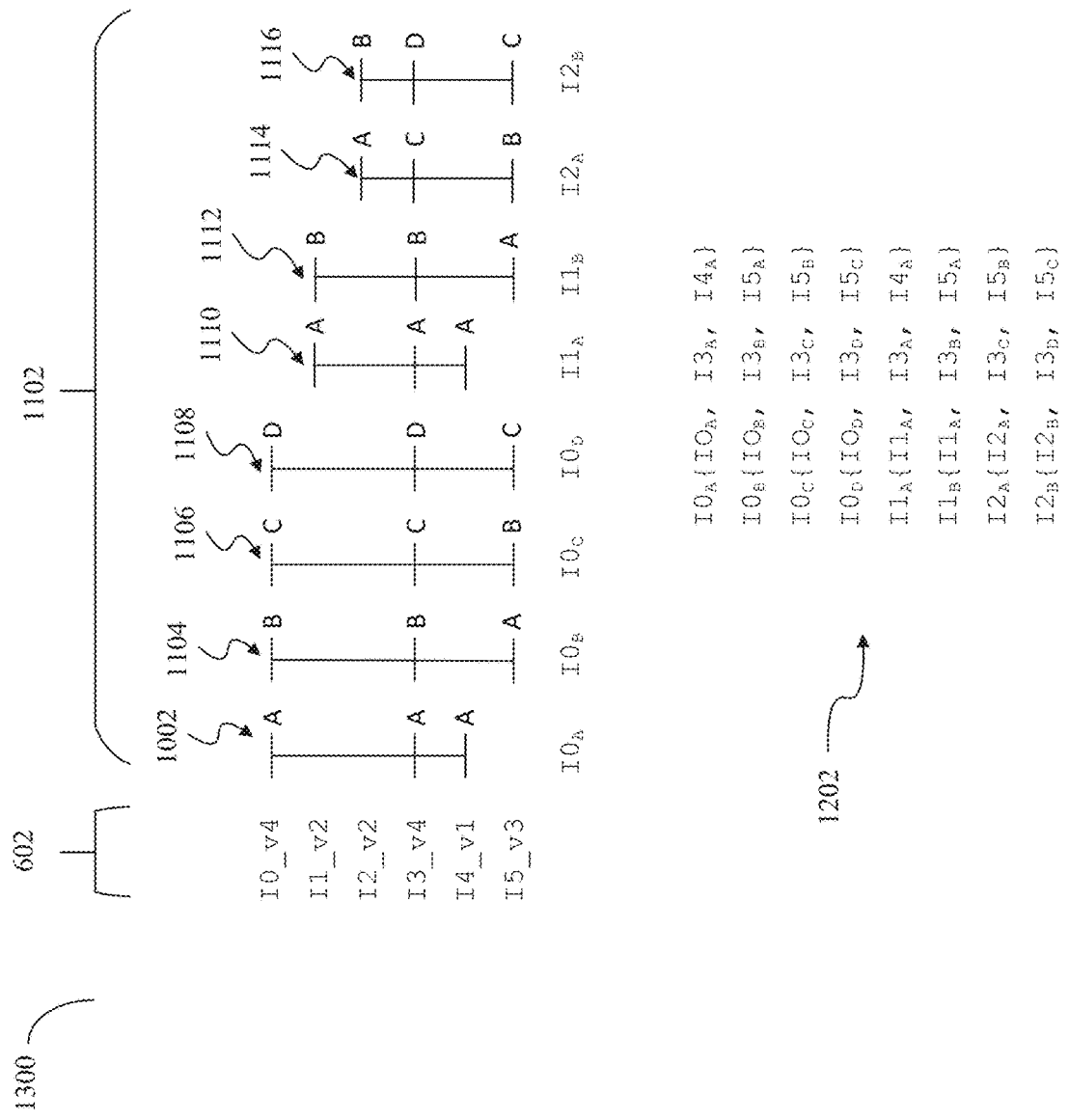
FIG. 13 illustrates the instruction sets of all SDF chains in the sample instruction set.
Figure 14:
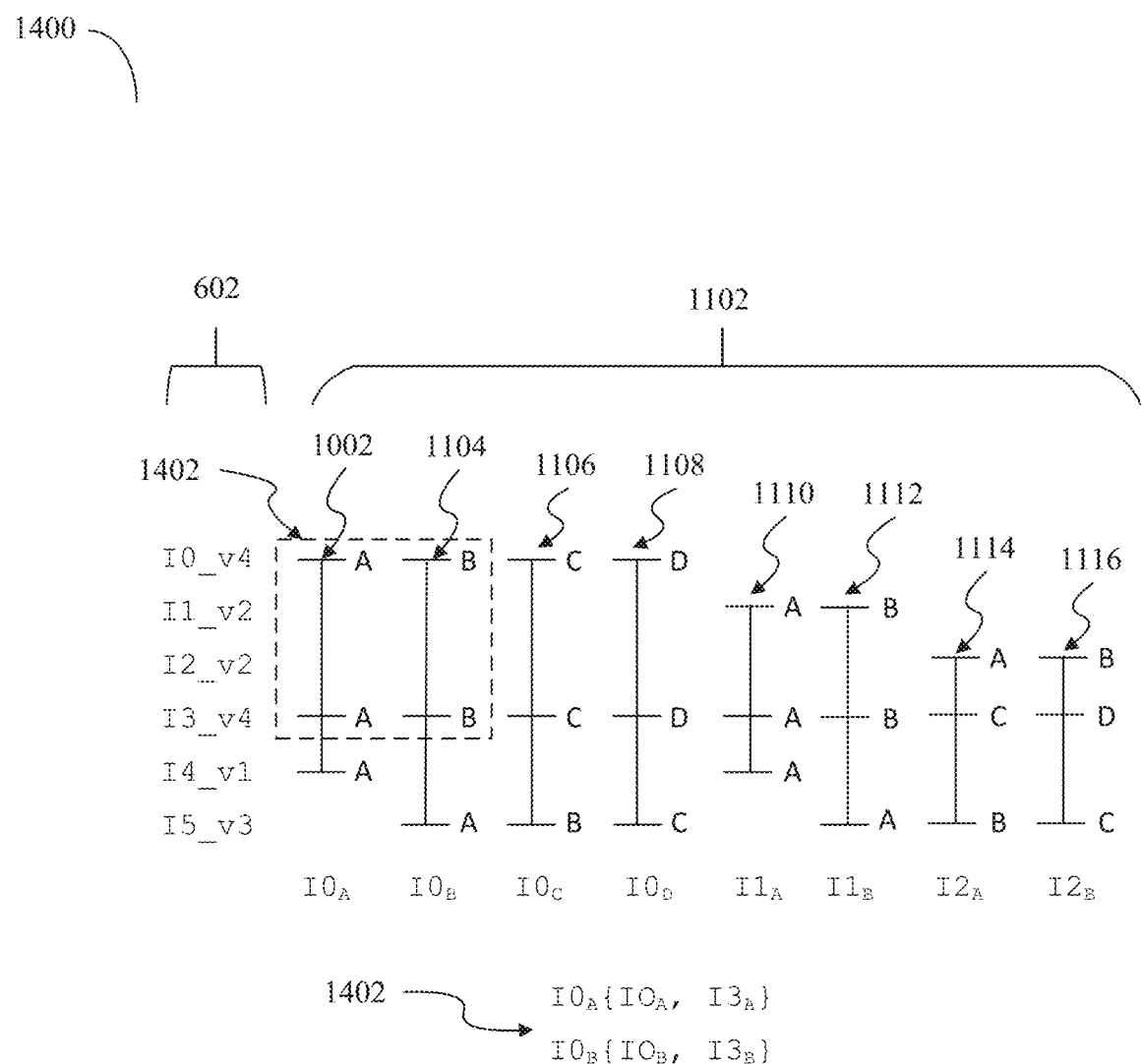
FIG. 14 illustrates a first example SDF bundle with area 4.

FIG. 12 illustrates the first SDF set 1202, $I0_A\{I0_A, I3_A, I4_A\}$, for bar 1002. The notation is for a set of instructions for a dependency chain 1002 that starts with the first burst in instruction 0, $I0_A$. The set includes the first burst of instruction 0, $I0_A$, the first burst of instruction 3, $I3_A$, then the first burst of instruction 4, $I4_A$. Using this notation, letters, A, B, C, . . . are used to indicate each execution in a burst. Therefore, a burst of 2 would include A and B, a burst of 4 would include A, B, C, and D, etc. FIG. 13 illustrates the resulting SDF sets 1202 generated from the bars 1102 of the dependencies as shown in FIG. 8. FIGS. 14 to 18 illustrate how sets of computer instructions are transformed based on the SDF bundles. FIG. 14 illustrates how bundles may be graphically selected from the bar depiction of the SDF sets 1102. The first step is to start at a point in a set, such as at the top of 1002, and check each subsequent set, such as 1104, for any overlapping ranges as indicated by points that are common to both sets and are on the same vertical level of the SDF bars 1102. Ranges are indicated in the representation 1102 as dashed rectangular shapes, with a width, height, and area. An example is the bundle 1402 that included the SDF sets; $I0_A\{I0_A, I3_A\}$ and $I0_B\{I0_B, I3_B\}$. Each bundle may be seen as having a width, a height, and an area, where the area is the width times the height. The width is the number of bars, corresponding to SDF sets, encompassed by the area. In the example of area 1402, the width is 2 as it encompasses SDF sets 1002 and 1104. The width corresponds to the length of a burst. In embodiments, there will be a maximum length of burst that is possible depending on constraints of the underlying hardware and software of the target device. In the example, the height is 2 as it encompasses 2 computer instructions, I0 and I3. The height of the area 1402 corresponds to the size of a resulting bundle.

Figure 15:
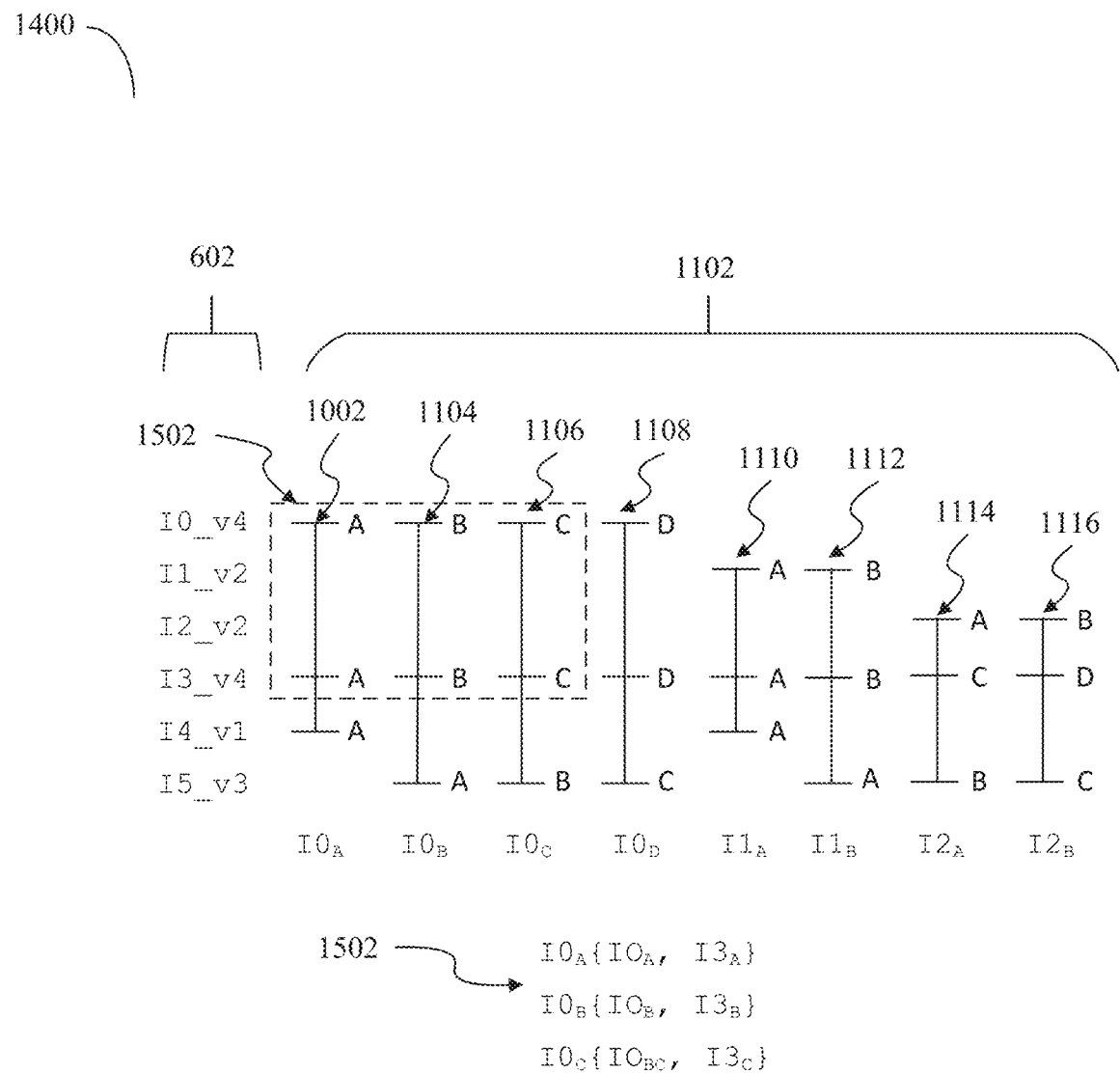
FIG. 15 illustrates a second example SDF bundle with area 6.
Figure 16:
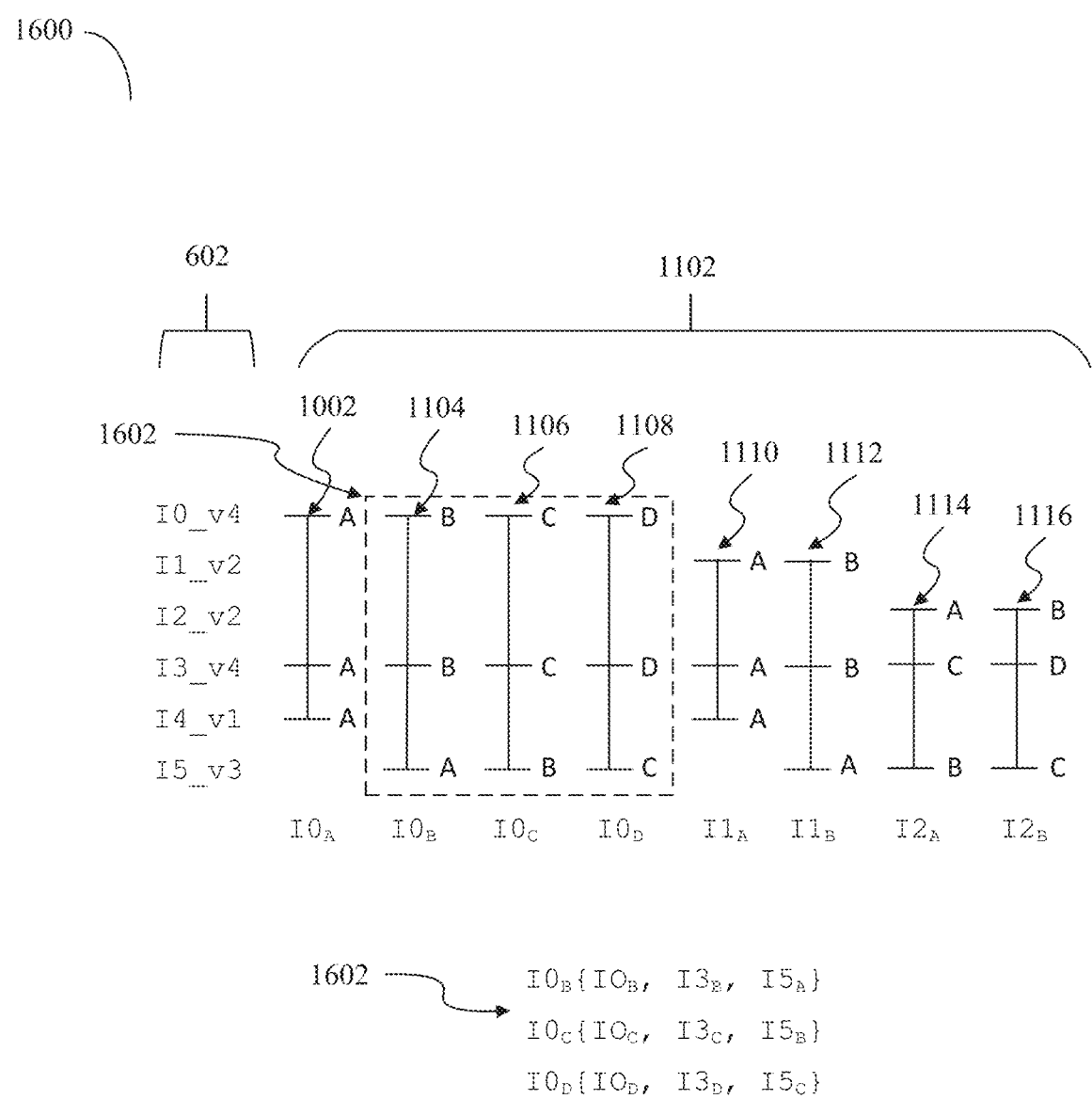
FIG. 16 illustrates a third example SDF bundle with area 9.

FIG. 15 illustrates a second, alternate, bundle 1502 with a width of 3, height of 2, and an area of 6. FIG. 16 illustrates a third, alternate, bundle 1602 with a width of 3, height of 3, and an area of 9. In general, the larger the area, the more optimum the solution and embodiments will repeat a process of identifying bundles until a set with the maximum area has been identified. In different embodiments, bundles may be evaluated based on different criteria, biasing width (burstization) or height (chain length). In architectures that support a maximum burst size or maximum chain length, these constraints may also be used when selecting the best bundle. For the present example, the optimum bundle is determined based on area and bundle 1602, with an area of 9, is selected.

In other embodiments, a burst parameter or a burstization criteria may have associated constraints that limit or favour a minimum burstization, a maximum burstization, a preferred burstization or some other factor used to determine the bias between burstization and chaining. These constraints may be used as compiler hints or compiler hard limitations. Burstization constraints may be motivated by available storage space, specifically cache space, as a smaller program will be more likely to completely fit in the instruction cache of computing hardware. Even if the executable instructions don't completely fit in the instruction cache, performance benefits will still be realized from less cache evictions that require access to slower main memory for cache refills. Constraints related to chaining may be driven by power consumption during instruction execution as chaining reduces the number of accesses, reads and writes, to the register file, or other constraints.

Figure 17:
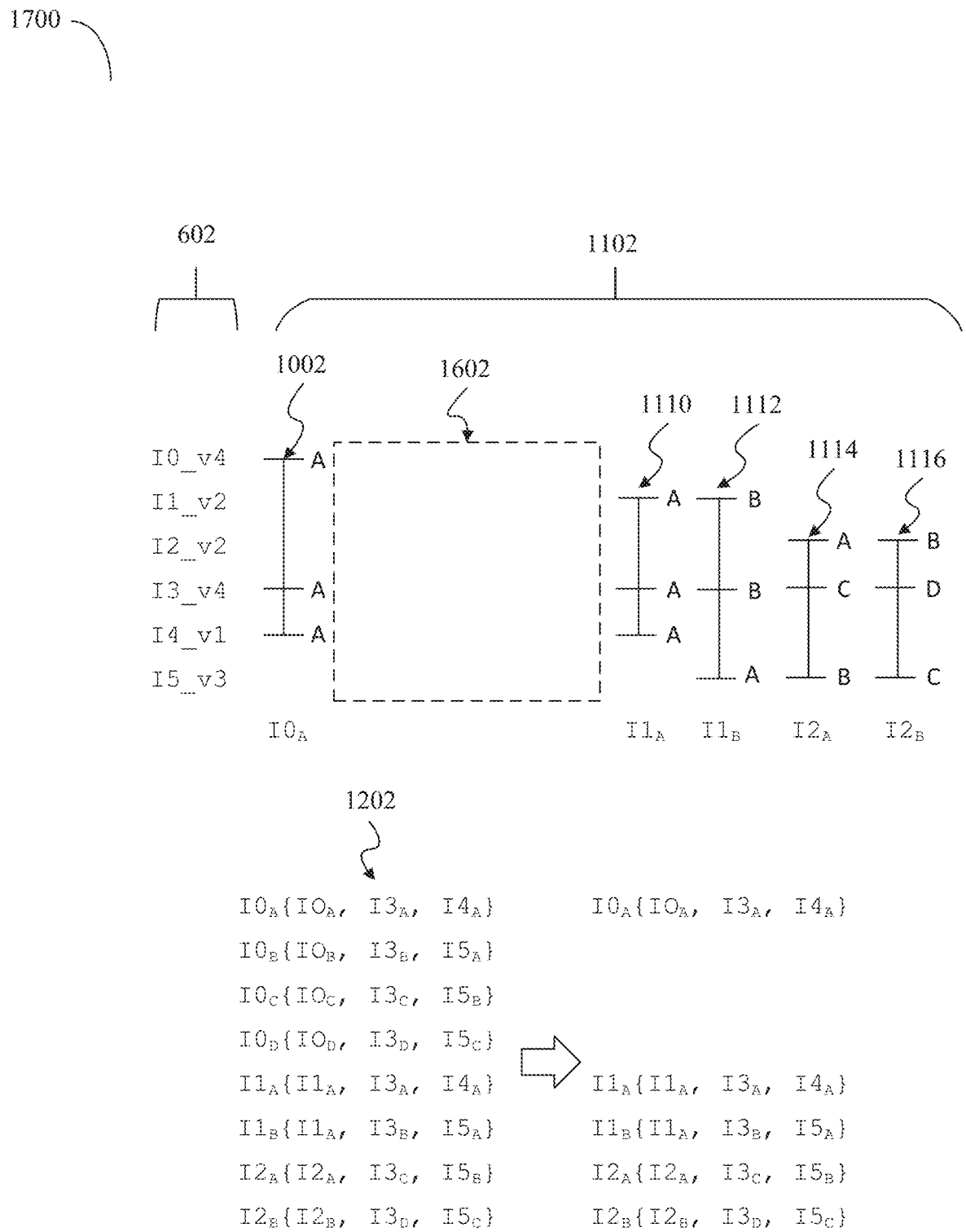
FIG. 17 illustrates a process of identifying an SDF bundle after accounting for the SDF bundle of FIG. 16.
Figure 18:
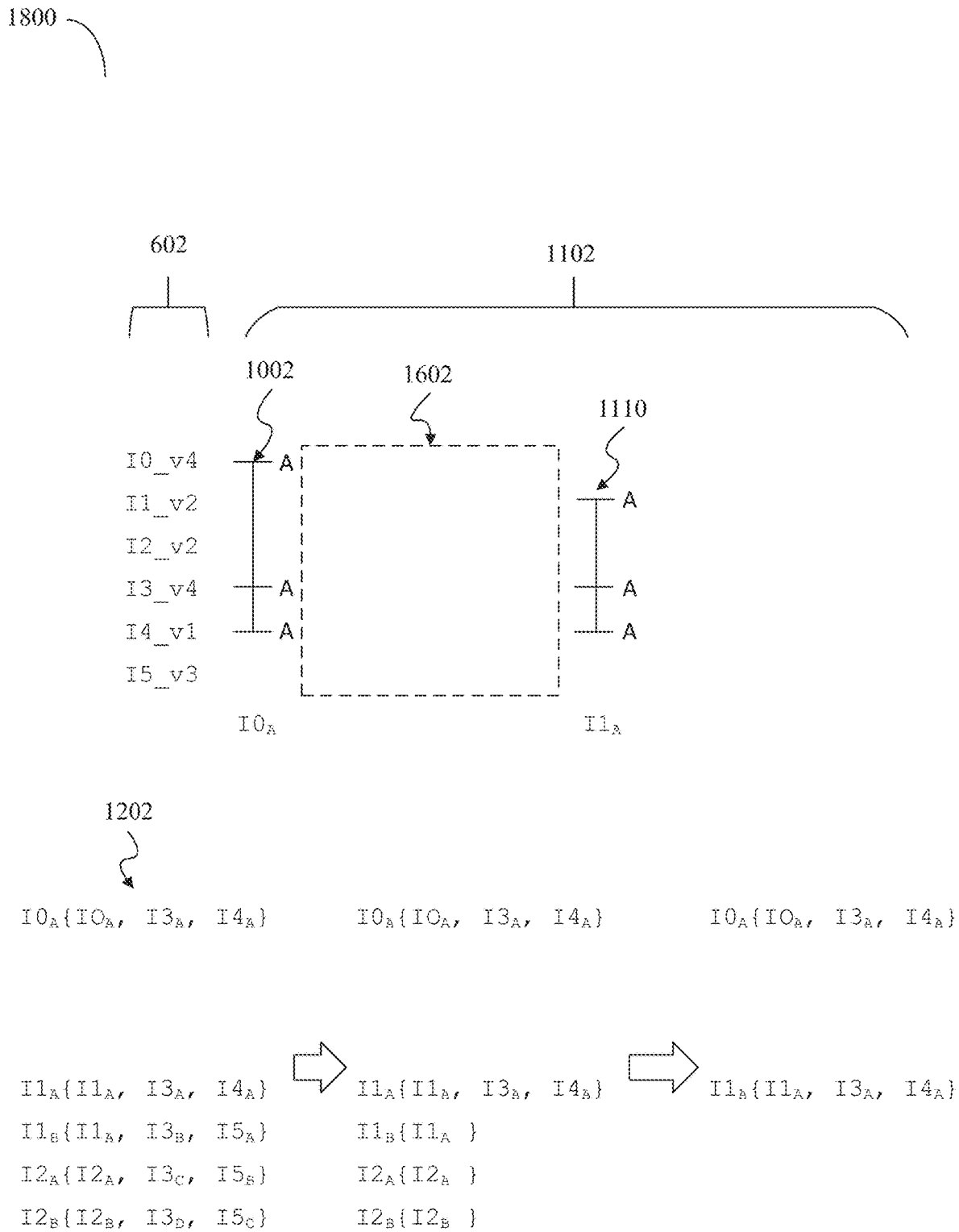
FIG. 18 illustrates a process of identifying an SDF bundle after accounting for the SDF bundle of FIG. 16 and the process illustrated in FIG. 17.

After selecting bundle 1602, the bundle selection process continues as shown in FIG. 17. As each instruction will only be executed once, computer instructions present in the selected set 1602 have been removed. Removing set 1602 removes all computer instructions contained in the set, including $I3_B$, $I3_C$, $I3_D$, $I5_A$, $I5_B$, and $I5_C$ that are also used in sets $I1_B$ 1112, $I2_A$ 1114, and $I2_B$ 1116. These computer instructions that are part of the removed bundle 1602, are also removed from sets $I1_B$ 1112, $I2_A$ 1114, and $I2_B$ 1116 as shown in FIG. 18. The resulting sets $I1_B$ 1112, $I2_A$ 1114, and $I2_B$ 1116 now only contain 1 instruction and cannot be part of a bundle or have burstization applied so are also removed. For example, SDF $I1_B$ 1112 contains points $I3_B$ and $I5_A$ which have been removed because they are also contained in the selected SDF $I0_B$. Now $I1_B$ has only one point left and will be removed.

Figure 19:
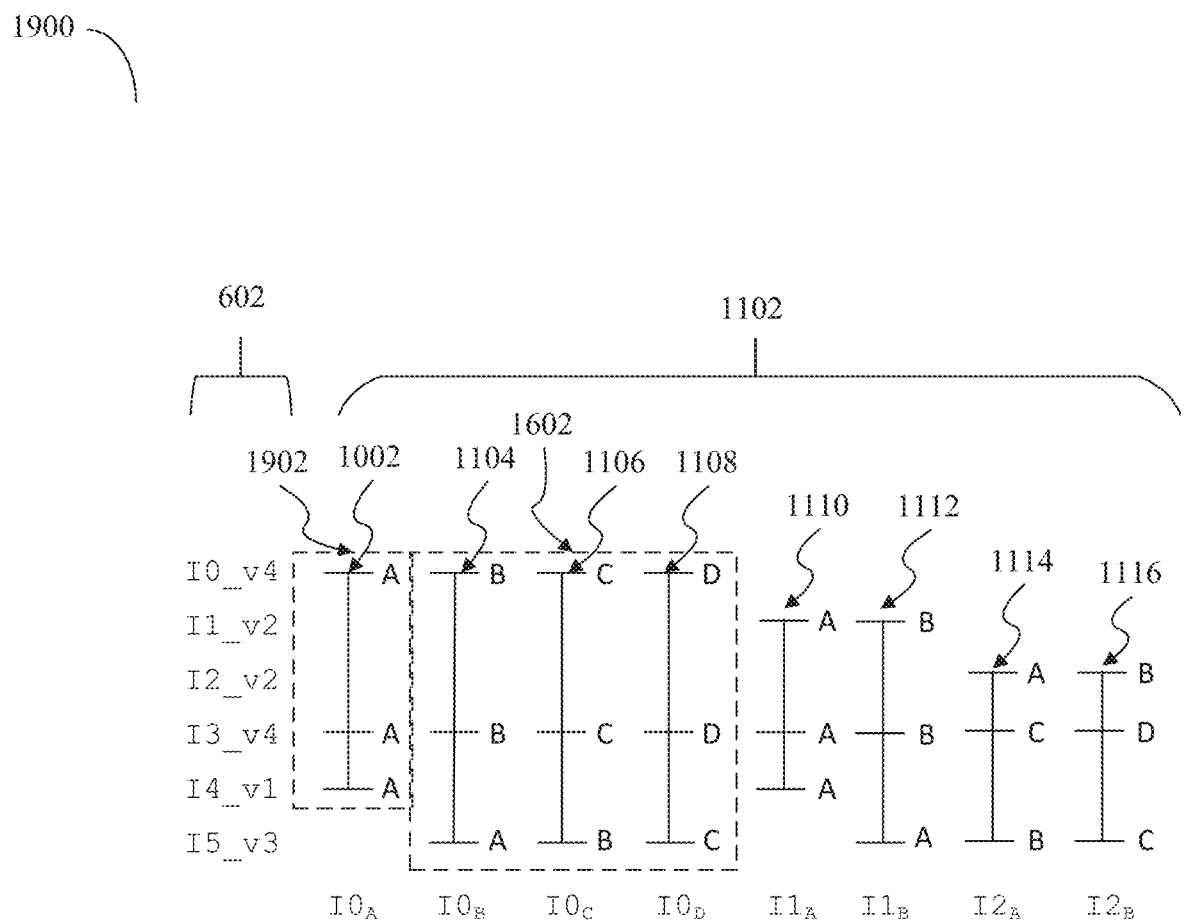
FIG. 19 illustrates the resulting SDF bundles generated by one embodiment.

As illustrated in FIG. 19, the next bundle selected is 1902 which has a width of 1, height of 3, and area of 3. It is removed and after the resulting removals, there are no SDFs to choose from and the final selected SDF bundles are 1602 and 1902.

Figure 20:
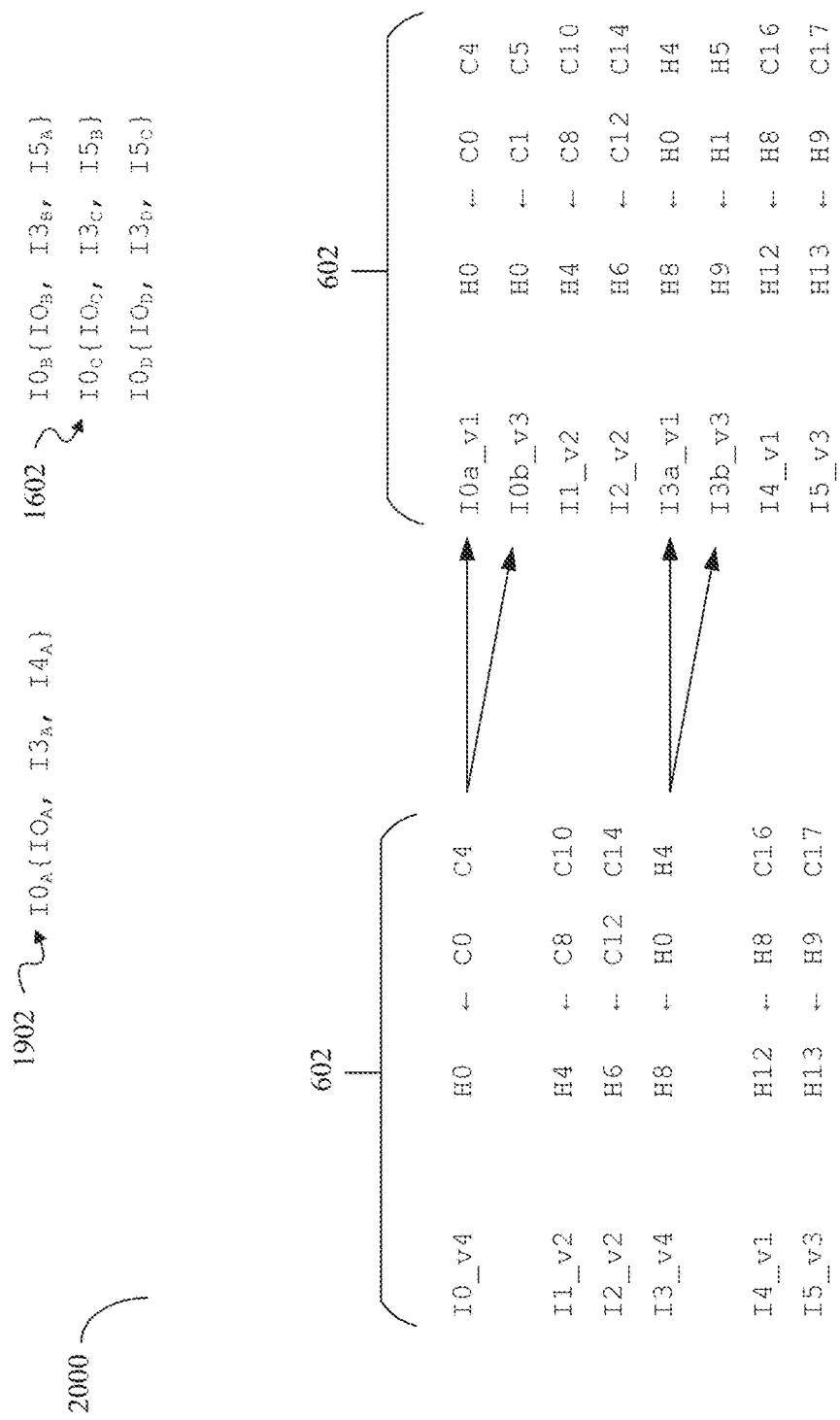
FIG. 20 illustrates the splitting of burst instructions in order to apply the SDF bundles according to an embodiment.

The application of the selected bundles to generate optimized instructions is illustrated in FIG. 20. In previous steps, bundles 1602 and 1902 have been selected. In this step, the selected groups are then used to transform the instructions by splitting set of computer instructions to create vector widths corresponding to the selected bundles, and then reordering to enable the computer instructions to be grouped or bundled. I0_v4, a burst of 4, is split into I0_v1 and I0_v3, with no bursts, and a burst of 3, respectively. I0_v1 is contained with bundle 1902 as $I0_A$. I0_v3 is contained within bundle 1602 as $I0_B$, $I0_C$, and $I0_D$. I3_v4 is similarly split into I3_v1 and I3_v3. I5 is already a burst of 3 so does not have to be split.

Figure 21:
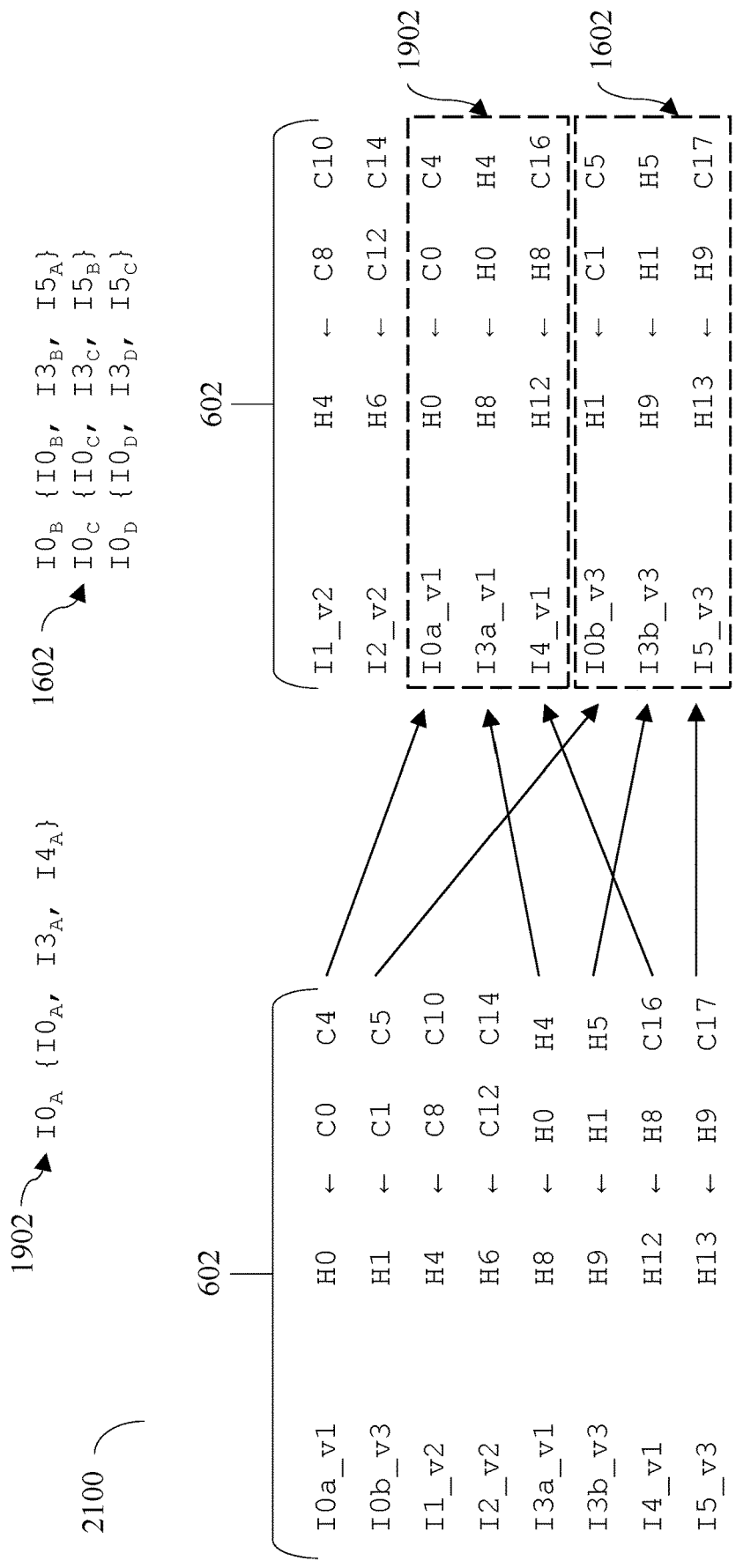
FIG. 21 illustrates the reordering of computer instructions in order to apply the SDF bundles according to an embodiment.
Figure 22:
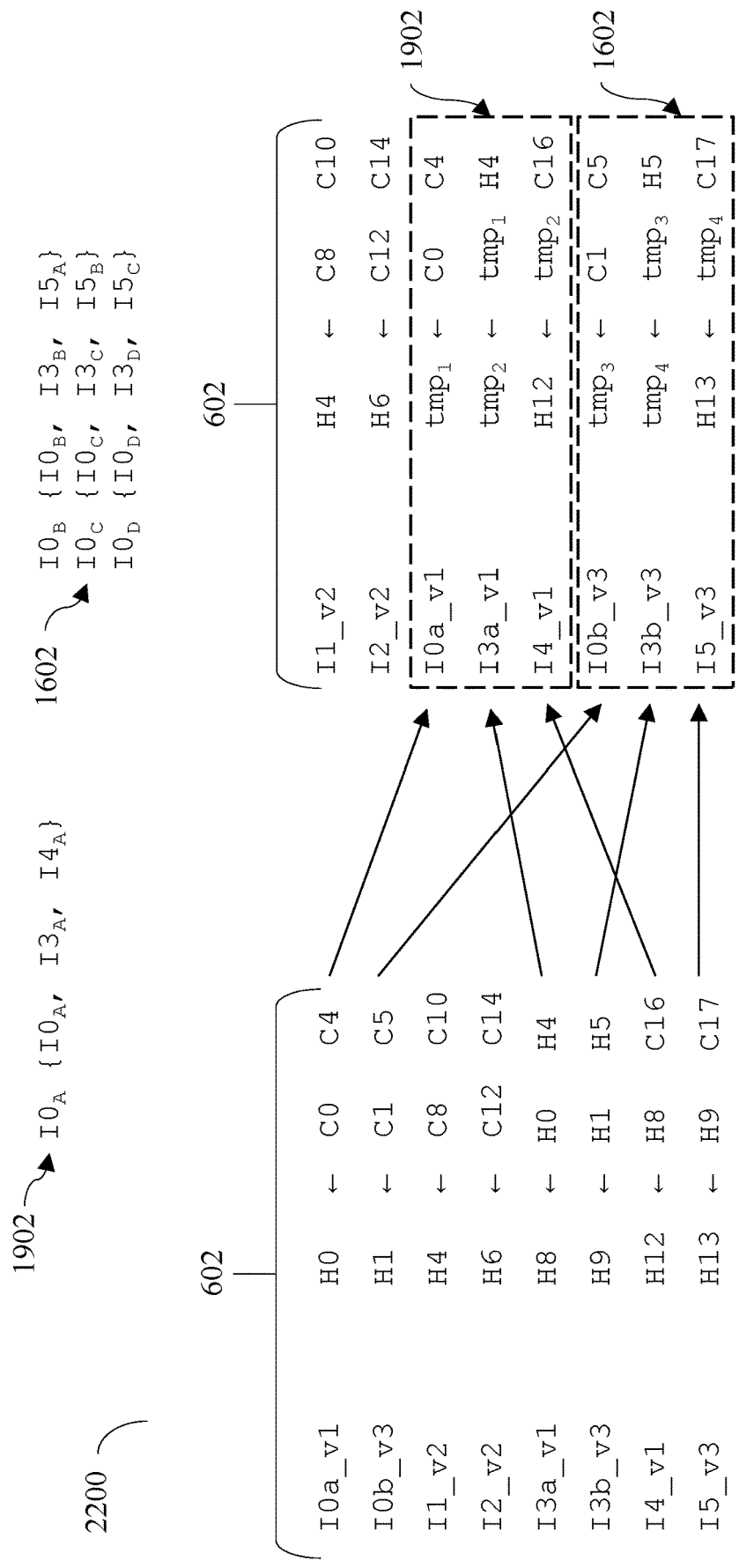
FIG. 22 illustrates the chaining and burstization of the example set of computer instructions according to an embodiment.

Once bursts of computer instructions have been split as shown in FIG. 20, they may be reordered based on the selected SDF bundles as shown in FIG. 21 for bundles 1602 and 1902. Once reordering has been done, register file registers may be replaced with temporary registers as illustrated in FIG. 22 to complete the process. The original instructions used 32 reads and 16 writes as shown in FIG. 5. The final optimized instructions uses a total of 24 reads and 8 writes that may lead to a decrease in power consumption when the optimized instructions are executed by a target device. However, the optimized instructions include 8 computer instructions, an increase of 2 from the original 6 computer instructions. If size of the instructions was a concern, a bias towards burstization could be used to attempt to decrease the size required for the instructions.

Figure 23:
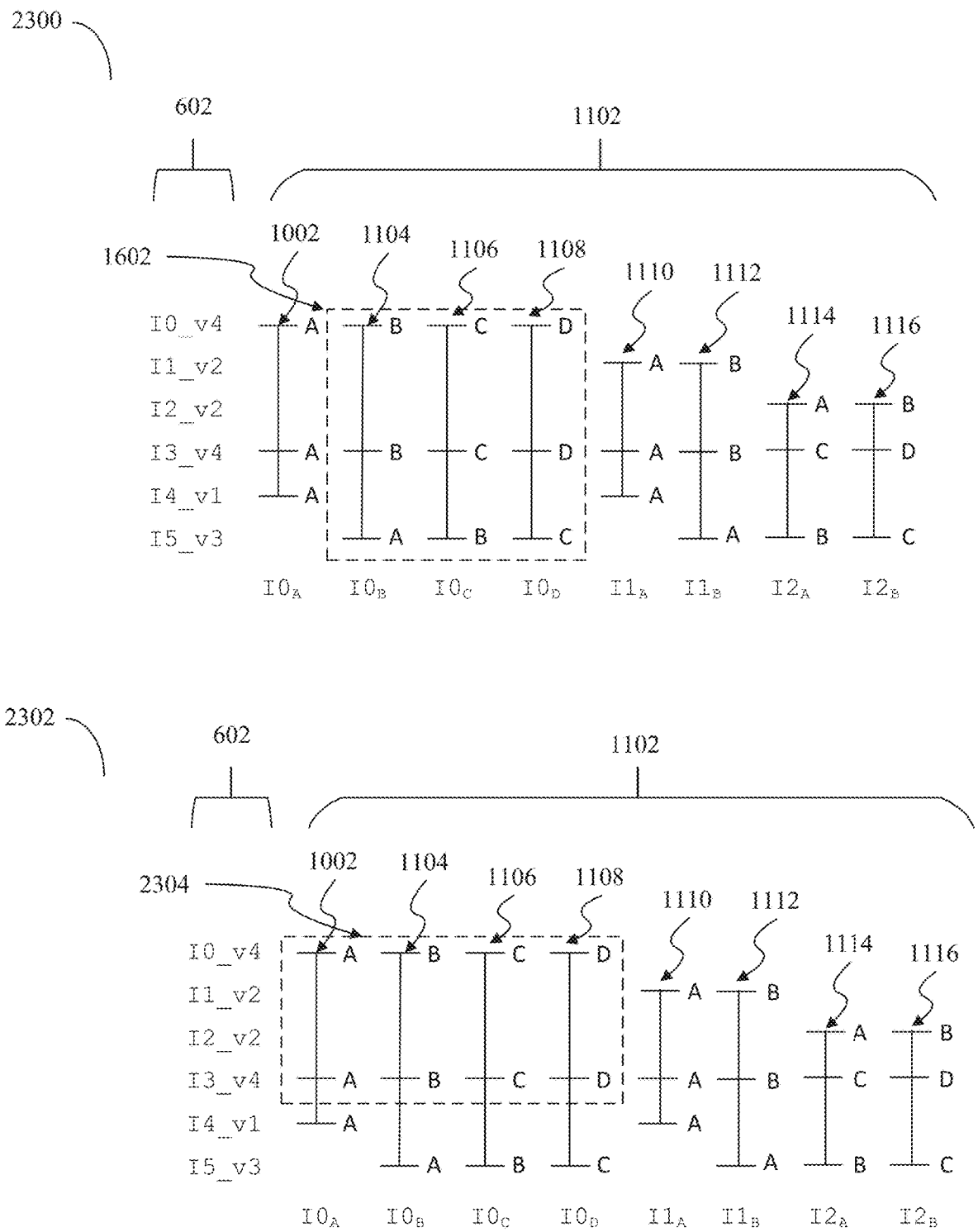
FIG. 23 illustrates how biasing chaining or burstization of computer instructions can affect the SDF bundles used in embodiments.

By taking into account both chaining and burstization, the algorithm can be used to balance these two factors or produce a bias towards one or the other. FIG. 23 illustrates how the use of biases between burstization and chaining may change the resulting SDF sets used to produce optimized instructions. If bustization is favoured, the first SDF bundle could be bundle 2304 which has a width of 4, a height of 2 and an area of 8. This is one less than the SDF bundle 1602 used previously. The wider the selection, for example area 1602, the longer the burst, within limits of the hardware executing the instructions. The higher the selection, the more computer instructions in the resulting chain, which may also be limited by the number or temporary registers of similar hardware.

In other embodiments, burstization may always be favoured over chaining. In this case burst instructions are never split and SDF bundles are selected to be as wide as the hardware will support whenever possible. This may produce solutions that produce smaller compiled instructions, and allow for fuller use of hardware resources, but at the expense of an increase in power consumption. This may be referred to as burstization with chaining. The opposite approach of favouring chaining over burstization is also possible which may produce a solution with a larger compiled instruction file that could lead to issues with cache usage but would minimize register file accesses and could decrease power consumption.

Other embodiments simplify the procedure of selecting SDF bundles by selecting the first SDF bundle that meets a predefined criterion such as minimum width, height, or area. Other embodiments will be constrained to never split bursts when applying the SDF bundles to produce final instructions.

Figure 24:
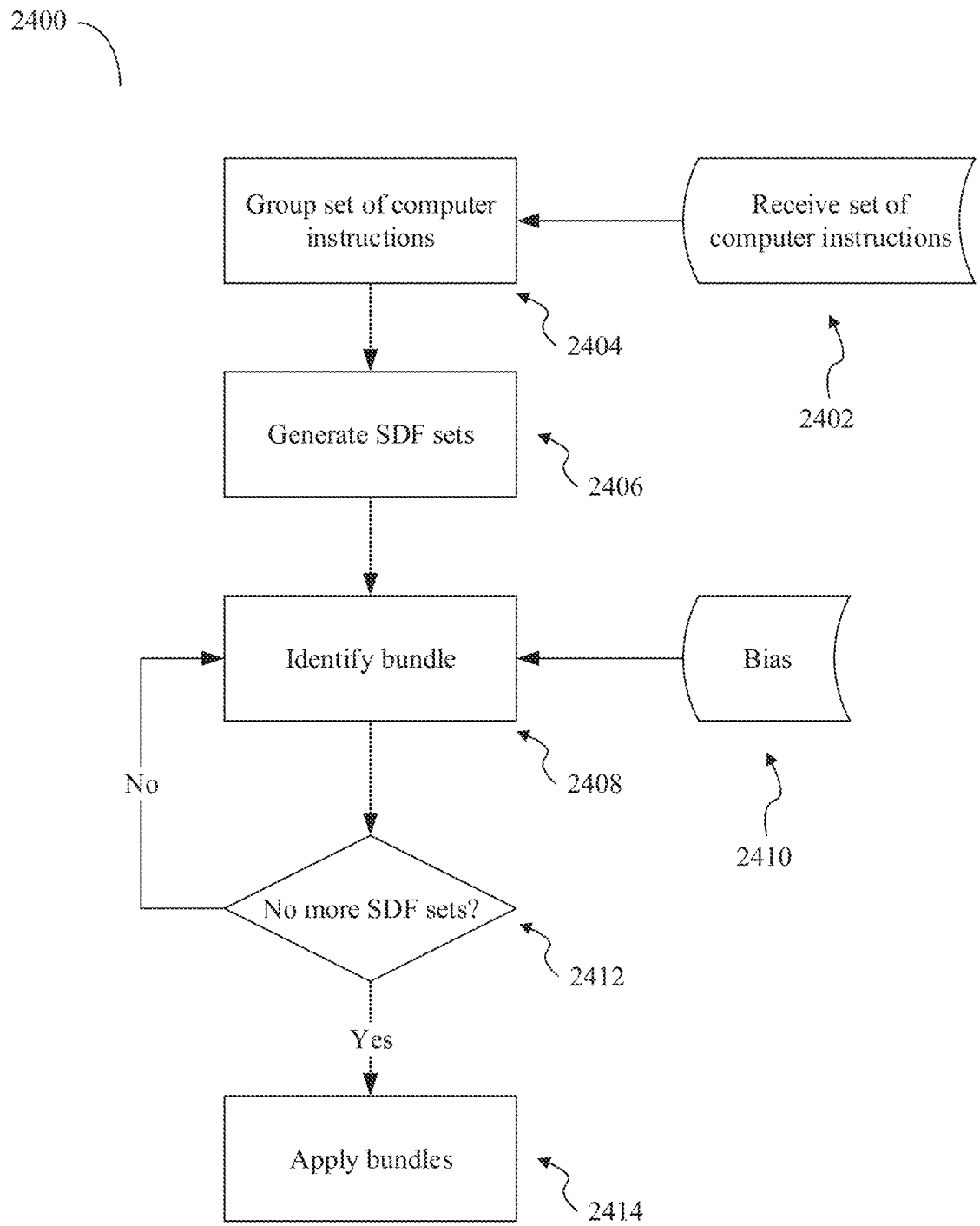
FIG. 24 illustrates an overview of an embodiment.

FIG. 24 summarizes the optimizing method 2400. The method starts when a set of computer instructions is received in step 2402. The register dependencies of the set of computer instructions is then determined so that the set of computer instructions may be grouped 2404 based on the register dependencies. SDF bundles are then generated from the grouped set of computer instructions in step 2406. In the next step 2408, taking bias 2410 into account, a first SDF bundle is selected. This process continues until there are no SDF sets left 2412. Finally, the bundles are applied to transform the set of computer instructions to produce optimized instructions.

Some embodiments include a method for grouping computer instructions including receiving a set of computer instructions, grouping the set of computer instructions by register dependencies, identifying one or more single-definition-use flow (SDF) bundles based on a burstization criteria and a chaining criteria, and based on the SDF bundles, transforming the set of computer instructions.

In further embodiments, the transformation includes splitting one of the set of computer instructions and setting a burst parameter for the one of the set of computer instructions. In other embodiments, the transformation includes grouping a plurality of the set of computer instructions and replacing a pair of register file accesses with a pair of temporary register accesses.

In further embodiments, the burstization criteria and the chaining criteria are biased to favour the burstization criteria. In other embodiments, the burstization criteria and the chaining criteria are biased to favour the chaining criteria.

A further embodiment includes identifying a first of the one or more SDF bundles, removing the computer instructions contained in the first of the one or more SDF bundles, and selecting a second of the one or more SDF bundles from the remaining computer instructions of the set of computer instructions.

In further embodiments, a maximum burst of the burst parameter is constrained by a hardware resource limitation.

Some embodiments include an apparatus for grouping computer instructions. The apparatus includes a CPU and a non-transitory computer readable storage medium configured to store compiler instructions. The compiler instructions control the CPU to perform steps of receiving a set of computer instructions, grouping the set of computer instructions by register dependencies, identifying one or more single-definition-use flow (SDF) bundles based on a burstization criteria and a chaining criteria, and based on the SDF bundles, transforming the set of computer instructions.

Some embodiments include an electronic device including a CPU and a non-transitory computer readable storage medium configured to execute the steps of a stored computer program. The stored computer program includes binary instructions compiled using the steps of receiving a set of computer instructions, grouping the set of computer instructions by register dependencies, identifying one or more single-definition-use flow (SDF) bundles based on a burstization criteria and a chaining criteria, and based on the SDF bundles, transforming the set of computer instructions.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of computer instructions that enable a computer device (personal computer, server, or network device) to execute the methods provided in the embodiments of the present invention. For example, such an execution may correspond to a simulation of the logical operations as described herein. The software product may additionally or alternatively include number of computer instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
   receiving a set of computer instructions;
   grouping the set of computer instructions by register dependencies;
   identifying a plurality of single-definition-use flow (SDF) bundles based on a burstization criteria and a chaining criteria, each of the plurality of SDF bundles comprising one of the set of computer instructions; and
   based on the SDF bundles, transforming the set of computer instructions.

2. The method of claim 1 wherein the transformation comprises splitting one of the set of computer instructions and setting a burst parameter for the one of the set of computer instructions.

3. The method of claim 2 wherein a maximum burst of the burst parameter is constrained by a hardware resource limitation.

4. The method of claim 1 wherein the transformation comprises grouping a plurality of the set of computer instructions and replacing a pair of register file accesses with a pair of temporary register accesses.

5. The method of claim 1 wherein the burstization criteria and the chaining criteria are biased to favour the burstization criteria.

6. The method of claim 1 wherein the burstization criteria and the chaining criteria are biased to favour the chaining criteria.

7. The method of claim 1 further comprising identifying a first of the plurality of SDF bundles, removing the computer instructions contained in the first of the plurality of SDF bundles, and selecting a second of the plurality of SDF bundles from the remaining computer instructions of the set of computer instructions.

8. An apparatus comprising:
   a CPU; and
   a non-transitory computer readable storage medium configured to store compiler instructions to control the CPU to perform steps of:
   receiving a set of computer instructions;
   grouping the set of computer instructions by register dependencies;
   identifying a plurality of single-definition-use flow (SDF) bundles based on a burstization criteria and a chaining criteria, each of the plurality of SDF bundles comprising one of the set of computer instructions; and
   based on the SDF bundles, transforming the set of computer instructions.

9. The apparatus of claim 8 wherein the transformation comprises splitting one of the set of computer instructions and setting a burst parameter for the one of the set of computer instructions.

10. The apparatus of claim 9 wherein a maximum burst of the burst parameter is constrained by a hardware resource limitation.

11. The apparatus of claim 8 wherein the transformation comprises grouping a plurality of the set of computer instructions and replacing a pair of register file accesses with a pair of temporary register accesses.

12. The apparatus of claim 8 wherein the burstization criteria and the chaining criteria are biased to favour the burstization criteria.

13. The apparatus of claim 8 wherein the burstization criteria and the chaining criteria are biased to favour the chaining criteria.

14. The apparatus of claim 8 wherein the compiler instructions further control the CPU to perform the steps of:
    identifying a first of the plurality of SDF bundles, removing the computer instructions contained in the first of the plurality of SDF bundles, and selecting a second of the plurality of SDF bundles from the remaining computer instructions of the set of computer instructions.

15. An electronic device comprising:
    a CPU; and
    a non-transitory computer readable storage medium configured to execute the steps of a stored computer program, instructions of the stored computer program compiled using the steps of:
       receiving a set of computer instructions;
       grouping the set of computer instructions by register dependencies;
       identifying a plurality of single-definition-use flow (SDF) bundles based on a burstization criteria and a chaining criteria, each of the plurality of SDF bundles comprising one of the set of computer instructions; and
       based on the SDF bundles, transforming the set of computer instructions.

16. The electronic device of claim 15 wherein the transformation comprises splitting one of the set of computer instructions and setting a burst parameter for the one of the set of computer instructions.

17. The electronic device of claim 16 wherein a maximum burst of the burst parameter is constrained by a hardware resource limitation of the electronic device.

18. The electronic device of claim 15 wherein the transformation comprises grouping a plurality of the set of computer instructions and replacing a pair of register file accesses with a pair of temporary register accesses.

19. The electronic device of claim 15 wherein the burstization criteria and the chaining criteria are biased to favour the burstization criteria.

20. The electronic device of claim 15 wherein the burstization criteria and the chaining criteria are biased to favour the chaining criteria.

* * * * *